Aug. 6, 1929.  W. C. STEVENS  1,723,387
TIRE BUILDING MACHINE
Original Filed Aug. 4, 1925
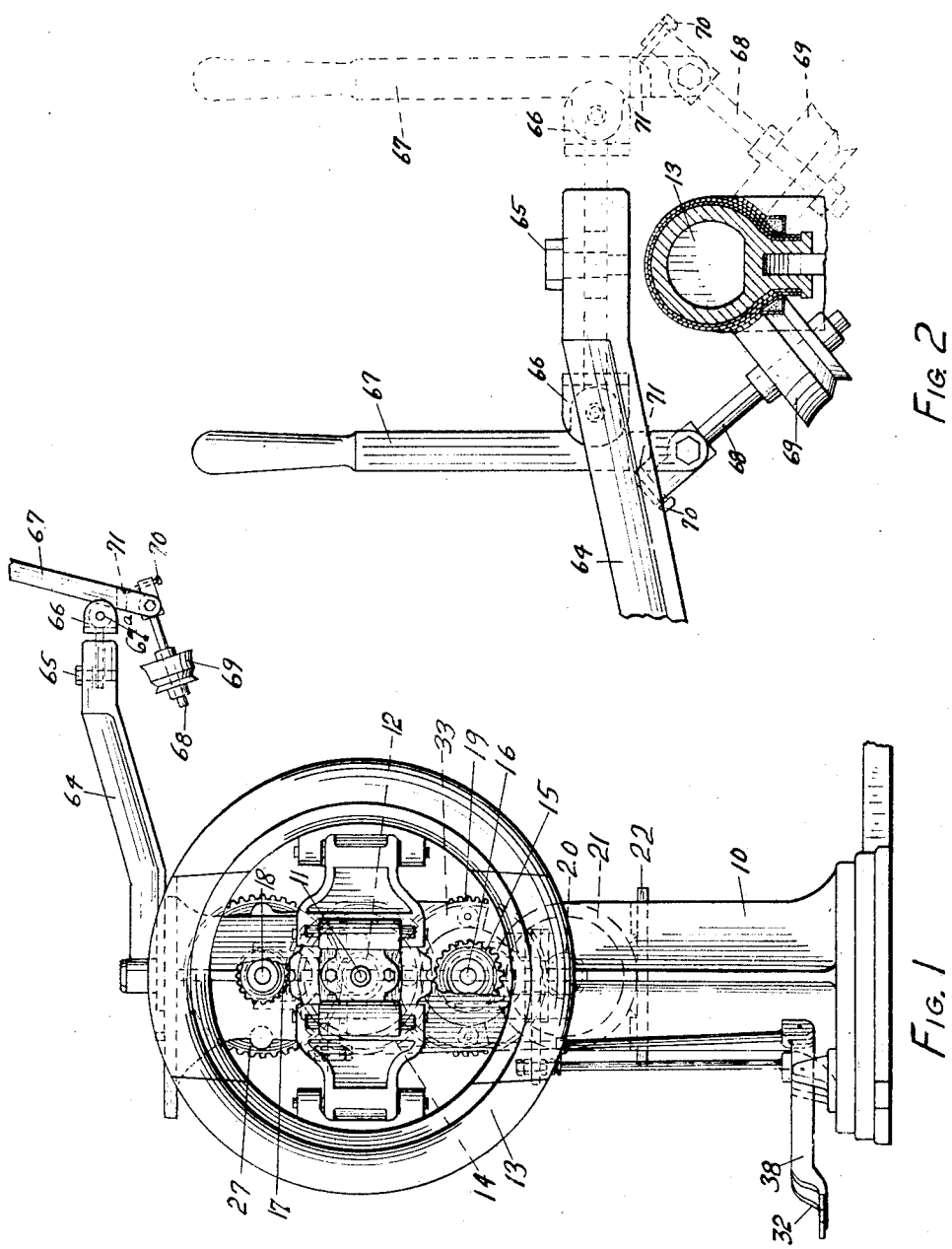
INVENTOR.
WILLIAM C. STEVENS
BY
Ely & Barrow
ATTORNEYS.

Patented Aug. 6, 1929.

1,723,387

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TIRE-BUILDING MACHINE.

Original application filed August 4, 1925, Serial No. 48,174. Divided and this application filed December 23, 1926. Serial No. 156,535.

This invention relates to tire building machines.

One object is to provide a novel bead-setting mechanism for tire building machines which will be inexpensive to manufacture and will be easily and quickly operable to place a bead in a tire. Particularly the object is to provide a single mechanism capable of quickly and effectively setting both beads in place in the tire.

The foregoing and other objects are obtained in the machine illustrated in the accompanying drawings and described in detail below. It is to be understood that the invention is not limited to the specific form thereof shown and described.

Of the accompanying drawings;

Figure 1 is a side elevation of a machine embodying the invention; and

Figure 2 is an end elevation illustrating the bead setting device in one working position thereof, the other working position thereof being indicated by dotted lines.

Referring to the drawings, 10 is a suitable standard having secured therein a spindle 11 on which is journaled a sleeve 12 having fixed thereon any suitable form of tire building core such as the collapsible core indicated at 13. Sleeve 12 has fixed thereon a gear 14 permanently meshed with a gear 15 on a shaft 16 and a gear 17 on a shaft 18, shaft 16 and 18 each being journaled on standard 10.

Shaft 16 has journaled thereon a gear 19 meshed with a pinion 20 on the rotor shaft of a motor 21 mounted on a bracket 22 on standard 10, gear 19 being connected through suitable reducing gears to a gear 27 journaled on shaft 18. Drive of core 13 through shaft 16 provides for comparatively rapid rotation thereof for stitching operations, while operation of core 13 through shaft 18 provides for a slow rotation thereof such as required for applying tire building material or beads on the core. Suitable clutches (not shown) are provided for operating the core at either speed and are actuated by foot pedals 32 and 38.

The bead placing device comprises an arm 64 swiveled on top of standard 10 and having swiveled in its free end on pin 65 a link 66 on which is pivoted at 67ª for movement in vertical planes a lever 67 which has connected to its lower end a second lever 68 carrying a bead-placing roller 69 of a profile adapted to fit about a tire bead as illustrated in Figure 2, lever 68 being angularly adjustable to position roller 69 at an angle relative to lever 67 such that it will properly set the bead in place, by means of a screw 70 threaded through lever 68 into engagement with a stop member 71 formed on lever 67.

After the two inner plies of the tire carcass are stitched into place, arm 64 is swung from the position shown in the drawings to a position such that its free end is over core 13 with levers 67 and 68 first on the outer side of the core as shown in the full line position. An annular bead is set on roller 69 and lever 67 is operated so as to urge it against the core, the latter being rotated, whereby roller 69 progressively rolls the bead into place about the tire. Lever 67 is then swung so as to withdraw roller 69 from the core, arm 64 being swung away from the core, and at the same time the unit comprising levers 67 and 68 is swung about pin 65 so as to carry it onto the inner side of the core, arm 64 being again swung over to position the bead-placing unit. The inner bead is then affixed in a similar manner to the outer bead. The bead-placing device is then swung out of the way, the remaining plies being stitched onto the core and about the beads to complete the carcass in the usual manner.

It will appear from the foregoing that applicant has provided a simple, inexpensive bead applying device capable of accurately positioning both beads of a tire. This device is originally shown and described in application Serial No. 48,174, filed August 4, 1925, of which this application is a division.

Modifications of the invention may be resorted to without departing from the spirit thereof or the scope of the appended claims.

What is claimed is:

1. Apparatus of the class described, comprising a rotatable core, and a bead placing device movable toward and from either side of said core adjacent the inner periphery thereof, said device including a support, an arm pivoted on the support so that its free end is movable over the outer periphery of the core, a member swiveled in said free end of said arm, a lever comprising angularly adjustable arms pivoted on said member, one lever arm extending outwardly of the periphery of said core, the other lever arm extending inwardly thereof, and a bead-setting roller on said other lever arm.

2. Apparatus of the class described, comprising a rotatable core, and a bead placing device movable toward and from either side of said core adjacent the inner periphery thereof, said device including a support, an arm pivoted on the support so that its free end is movable over the outer periphery of the core, a member swiveled in said free end of said arm, a lever, one lever arm extending outwardly of the periphery of said core, the other lever arm extending inwardly thereof, and a bead-setting roller on said other lever arm.

3. Apparatus of the class described, comprising a rotatable core, and a bead placing device movable toward and from either side of said core adjacent the inner periphery thereof, said device including a member bodily movable from a remote position over the outer periphery of said core, a second member swiveled thereon, a lever pivoted on said second member, and a bead setting roller carried by said lever.

4. Apparatus of the class described, comprising a rotatable core, and a bead placing device movable toward and from either side of said core adjacent the inner periphery thereof, said device including a horizontally swiveled support movable bodily over said core, a lever pivoted thereon for movements in vertical planes, and a bead setting roller on said lever.

WILLIAM C. STEVENS.